No. 758,747. PATENTED MAY 3, 1904.
T. GARE.
MEANS FOR SETTING TIRES OR THE LIKE ON THE FELLIES OF WHEELS.
APPLICATION FILED JAN. 27, 1903.
NO MODEL. 2 SHEETS—SHEET 1.
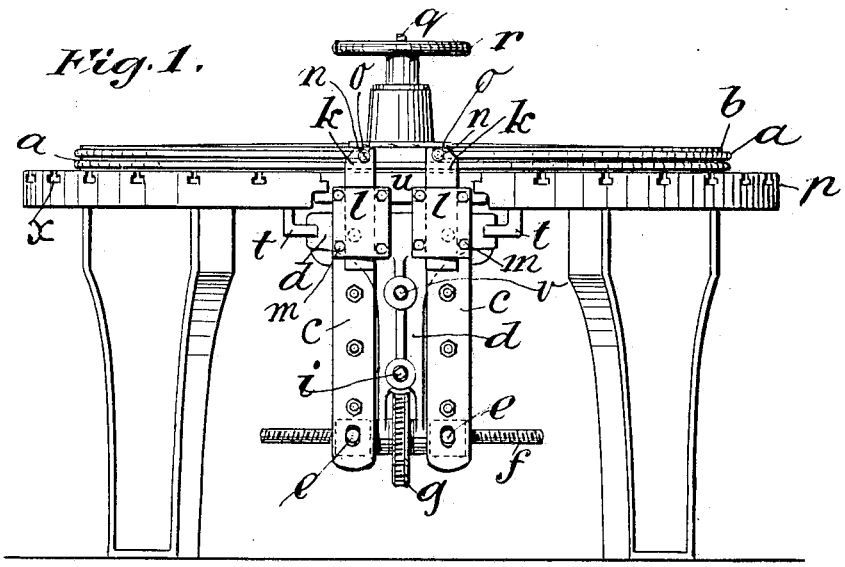
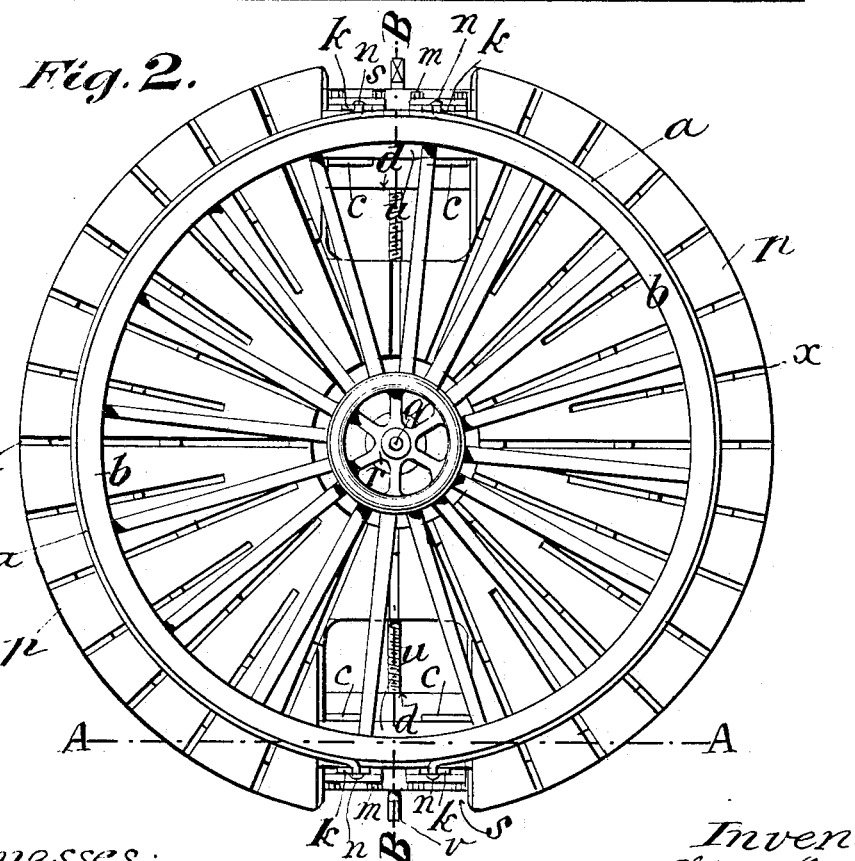
Witnesses:
Alfred Bosshardt
Stanley W Bramall
Inventor
Thomas Gare
By F. Bosshardt.
Attorney.

No. 758,747. PATENTED MAY 3, 1904.
T. GARE.
MEANS FOR SETTING TIRES OR THE LIKE ON THE FELLIES OF WHEELS.
APPLICATION FILED JAN. 27, 1903.
NO MODEL. 2 SHEETS—SHEET 2.
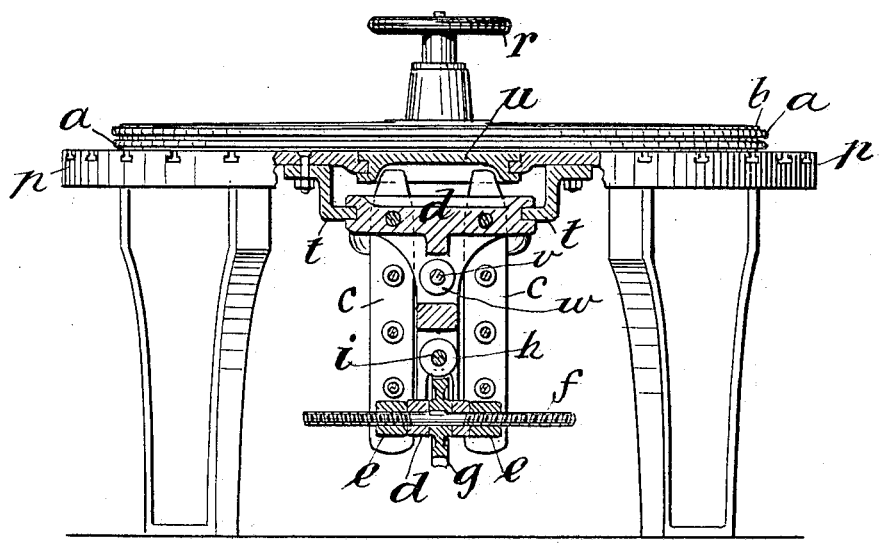
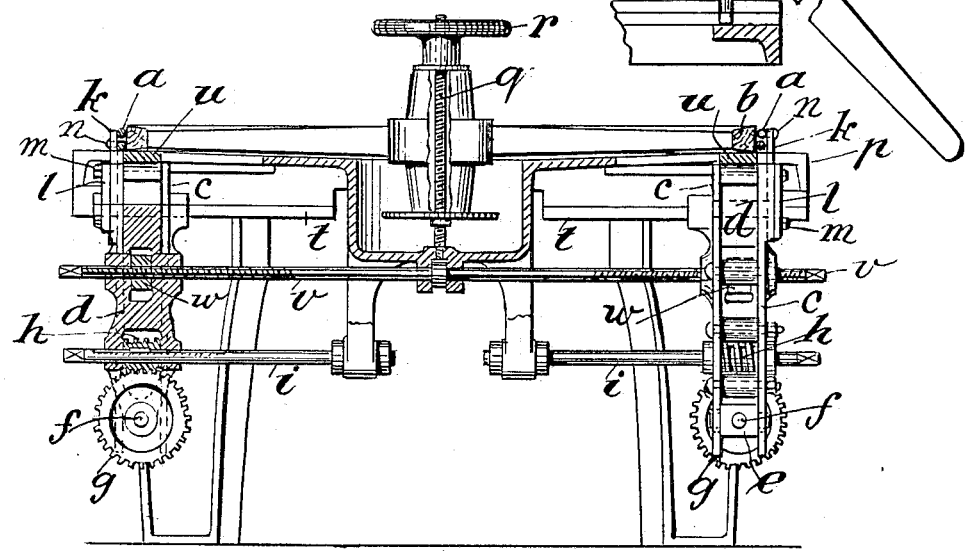
Witnesses:
Alfred Bosshardt.
Stanley R. Bramall.
Inventor
Thomas Gare.
By F. Bosshardt.
Attorney No. 758,747.                                                    Patented May 3, 1904.

UNITED STATES PATENT OFFICE.

THOMAS GARE, OF NEW BRIGHTON, ENGLAND, ASSIGNOR TO THE GARE PATENT TYRE AND WHEEL COMPANY, LIMITED, OF LIVERPOOL, GREAT BRITAIN.

MEANS FOR SETTING TIRES OR THE LIKE ON THE FELLIES OF WHEELS.

SPECIFICATION forming part of Letters Patent No. 758,747, dated May 3, 1904.

Application filed January 27, 1903. Serial No. 140,720½. (No model.)

*To all whom it may concern:*

Be it known that I, THOMAS GARE, a subject of the King of Great Britain, residing at New Brighton, in the county of Chester, England, (whose post-office address is Bramble Beach, Warren Drive, New Brighton, aforesaid,) have invented new and useful Improvements in Means for Setting Tires or the Like on the Fellies of Wheels, (for which I have made application for a patent in Great Britain, No. 14,896, dated July 4, 1902,) of which the following is a specification.

This invention relates to improvements in means for setting ordinary tires or the channels or rims of elastic tires upon the fellies of wheels. Hitherto such tires, channels, or rims have been shrunk on the felly of the wheel or forced thereon by hydraulic power, which is both troublesome and expensive.

The object of my invention is to provide means whereby such tires, channels, or rims can be set onto the fellies of wheels not only more readily but also more accurately without damage to the wheel; and it consists chiefly in compressing the felly by one or more metal straps or bands sufficiently to allow of placing the tire or the like on the felly and after having removed the said straps or bands forcing the tire or the like completely on the felly by suitable levers. I attain this object by the mechanism illustrated in the accompanying two sheets of the drawings, in which—

Figure 1 is an elevation; Fig. 2, a plan; Figs. 3 and 4, sectional elevations at line A A and B B, respectively, of Fig. 2; and Fig. 5, a view of a detail.

Similar letters refer to similar parts throughout the several views.

In carrying out my invention and referring to the figures generally I set the tire or the like on the wheel by placing one or more metal straps or bands $a$ around the felly $b$ and drawing the ends thereof together, and thereby compress the felly to such a diameter as will permit of placing the tire or the like on the same, the said straps or bands being afterward removed and the tire or the like completely forced on the felly by means of suitable levers. (See Fig. 5.)

In the present instance two of the straps or bands $a$ are used, which may consist of an open steel ring, as shown, or of a chain or wire rope, as will be readily understood without illustration. The free ends of each of the said straps or bands are readily removably attached to a pair of levers $c$, pivoted at diametrically opposite points to a bracket $d$, suitably held in position. The other ends of the said levers carry each a nut $e$, adapted to swivel and receive, respectively, a right and left hand screw-threaded spindle $f$, mounted in the lower end of the bracket $d$ and adapted to be rotated.

In the present instance the screwed spindles $f$ are each furnished with a worm-wheel $g$ in gear with a worm $h$, secured upon a shaft $i$, mounted in the lower end of the bracket $d$, and the said shaft adapted to be turned by such as a handle. When turning the said spindle in one direction, the ends of the said straps or bands approach and when turned in the other direction recede from each other, and thus respectively cause the said straps or bands to compress or release the felly, as may be required.

In order to accommodate various widths of wheels to be tired, the upper ends of the said levers are each adapted to be lengthened by a plate $k$, rendered adjustable thereon, say, by a cap $l$ and set-screws $m$.

For large variations in diameter of wheels straps or bands of different lengths are provided, and to permit of readily attaching and removing such straps or bands from the respective lever ends or plates the free ends of the said straps or bands are each formed with a headed stud $n$, adapted to engage in a slot $o$, formed in the ends of the said plates.

To hold the wheel to be tired in position, a table $p$ is provided, upon which it is centrally secured by a screwed spindle $q$ and nut $r$. At diametrically opposite points two gaps $s$ are formed in this table, through which project the upper ends of the levers $c$, the bracket $d$ being adapted to slide radially on guides $t$, formed below the said table. In each of the said gaps a plate $u$ is employed between the upper ends of the sides of each pair of levers $c$ to fill up and thus support the felly across the said gaps. The plates $c$ and bracket $d$ are rendered jointly adjustable to and from the center of the table $p$ by means of a spindle $v$, adapted to be rotated by a handle and having a left and right hand screw-thread engaging in corresponding nuts $w$ held in the brackets $d$, so as to allow of bringing the said levers and plates jointly nearer to or farther away from each other, and thus accommodate various diameters of wheels to be tired.

The table $p$ I form with radial slots $x$, adapted to receive the T-head of bolts $y$, the free ends of which are bent and adapted to serve as a fulcrum for the lever $z$, by means of which the tire $l$ or the like is forced on the felly of the wheel after having previously removed the straps or bands $a$. In lieu of operating the said levers by means of a right and left hand screw-threaded spindle, as described, the same may be operated by hydraulic means. Again, the said levers may be entirely dispensed with and the ends of the said straps or bands caused to be drawn together by hydraulic means, as will be readily understood with illustration.

What I claim as my invention, and desire to secure by Letters Patent, is—

1. In an apparatus for setting tires and the like upon the fellies of wheels, a metal felly-compressing strap of a width less than that of the felly, a pair of levers for drawing the said strap ends toward each other, a radially-adjustable plate upon the upper end of each of the said levers having a slot, a stud on each of the said strap ends engaging in the said slots and means for operating the said levers at their lower ends, all combined substantially as and for the purpose set forth.

2. In an apparatus for setting tires and the like upon the fellies of wheels, a metal felly-compressing strap of a width less than that of the felly, a pair of levers for drawing the said strap ends toward each other, a radially-adjustable plate upon the upper end of each of the said levers having a slot, a stud on each of the said strap ends engaging in the said slots, a right and left hand screw-threaded spindle, a nut pivoted to each lower end of the said levers in which the said spindle engages and means for turning the latter and thereby operating the said levers, all combined substantially as and for the purpose set forth.

In witness whereof I have hereunto set my hand in presence of two witnesses.

THOMAS GARE.

Witnesses:
ALFRED BOSSHARDT,
STANLEY R. BRAMALL.